US007114147B2

(12) United States Patent  (10) Patent No.: US 7,114,147 B2
Ballantyne et al.  (45) Date of Patent:  Sep. 26, 2006

(54) METHOD AND SYSTEM FOR REPORTING XML DATA BASED ON PRECOMPUTED CONTEXT AND A DOCUMENT OBJECT MODEL

(75) Inventors: Alando M Ballantyne, Austin, TX (US); Michael K Smith, Austin, TX (US); Larry M Hines, Austin, TX (US)

(73) Assignee: Electronic Data Systems Corporation, Plano, TX (US)

(*) Notice: Subject to any disclaimer, the term of this patent is extended or adjusted under 35 U.S.C. 154(b) by 348 days.

(21) Appl. No.: 09/840,727

(22) Filed: Apr. 23, 2001

(65) Prior Publication Data

US 2001/0044811 A1 Nov. 22, 2001

Related U.S. Application Data

(63) Continuation-in-part of application No. 09/522,277, filed on Mar. 9, 2000.

(51) Int. Cl.
*G06F 9/44* (2006.01)
*G06F 17/21* (2006.01)

(52) U.S. Cl. .............. 717/107; 715/500; 715/513

(58) Field of Classification Search ........ 717/104–108, 717/100, 168; 707/101–102; 715/513, 500, 715/505; 719/310, 320, 319
See application file for complete search history.

(56) References Cited

U.S. PATENT DOCUMENTS

| 5,640,550 | A |  | 6/1997 | Coker ..................... 395/604 |
| 5,857,194 | A | * | 1/1999 | Kelliher et al. ............ 707/101 |
| 5,960,200 | A |  | 9/1999 | Eager et al. ............... 395/705 |
| 6,125,391 | A | * | 9/2000 | Meltzer et al. ............ 709/223 |
| 6,182,024 | B1 |  | 1/2001 | Gangopadhyay et al. ..... 703/22 |
| 6,209,124 | B1 | * | 3/2001 | Vermeire et al. ........... 717/114 |
| 6,230,117 | B1 |  | 5/2001 | Lymer et al. ................ 703/22 |
| 6,347,307 | B1 | * | 2/2002 | Sandhu et al. ............... 705/35 |
| 6,418,446 | B1 | * | 7/2002 | Lection et al. .......... 707/103 R |
| 6,418,448 | B1 | * | 7/2002 | Sarkar .................... 707/104.1 |
| 6,427,230 | B1 |  | 7/2002 | Goiffon et al. ............. 717/108 |
| 6,446,110 | B1 |  | 9/2002 | Lection et al. ............. 709/203 |
| 6,502,236 | B1 |  | 12/2002 | Allen et al. ................ 717/136 |
| 6,519,617 | B1 | * | 2/2003 | Wanderski et al. ......... 715/513 |
| 6,523,042 | B1 | * | 2/2003 | Milleker et al. ........... 707/102 |

(Continued)

FOREIGN PATENT DOCUMENTS

WO  WO 01 86476  11/2001

OTHER PUBLICATIONS

Shanmugasundaram et al. "Relational Databases for Querying XML Documents: Limitations and Opportunities". Proceedings o the 25th VLDB Conference, Edinburgh, Scotland, 1999.*

(Continued)

*Primary Examiner*—Mary J. Steelman
(74) *Attorney, Agent, or Firm*—Baker Botts L.L.P.

(57) ABSTRACT

A method and system for modifying program applications of a legacy computer system to directly output data as XML using a DOM instance, models the legacy computer system, maps the model to an XML schema and automatically modifies one or more applications to directly output XML formatted data from an internally constructed DOM instance in cooperation with a writer engine. The writer engine allows for an arbitrary number of contexts to be simultaneously active and builds a complete DOM instance by using the multiple contexts to buffer output data. The writer engine directly loads XML schema information to construct and output DOM instances in accordance with the schema and subject to further transformation by XSLT stylesheets.

24 Claims, 9 Drawing Sheets

U.S. PATENT DOCUMENTS

| | | | |
|---|---|---|---|
| 6,550,054 B1* | 4/2003 | Stefaniak | 717/104 |
| 6,604,100 B1* | 8/2003 | Fernandez et al. | 707/3 |
| 6,609,108 B1* | 8/2003 | Pulliam et al. | 705/27 |
| 6,618,852 B1* | 9/2003 | van Eikeren et al. | 717/108 |
| 6,687,873 B1* | 2/2004 | Ballantyne et al. | 715/500 |
| 6,810,429 B1* | 10/2004 | Walsh et al. | 709/246 |
| 6,954,751 B1* | 10/2005 | Christfort et al. | 707/6 |
| 2002/0156772 A1 | 10/2002 | Chau et al. | 707/3 |
| 2003/0005410 A1 | 1/2003 | Harless | 717/114 |

OTHER PUBLICATIONS

Ning J Q et al., "Automated support for legacy code understanding", ACM Press New York, NY, USA pp. 50-57 Periodical-Issue-Article Year of Publication: 1994 ISSN:0001-0782.*

Sneed, H.M., "Generation of stateless components from procedural programs for reuse in a distributed system", Software Maintenance and Reengineering, 2000. Proceedings of the Fourth European , Feb. 29-Mar. 3, 2000, pp. 183-188.*

O'Hare et al., "RE-Analyer: From source code to structured analysis",IBM SYSTEMS Journal, vol. 33, No. 1, 1994Constraints-preserving Transformation from XML Document Type Definition to Relational Schema.*

"Webster's II New Riverside University Dictionary", The Riverside Publishing Company, pp. 418,762,308, 1226.*

Robie, Jonathan; "What is the Document Object Model?", 1998, <URL  http://www.w3.org/□□TR/1998/REC-DOM-Level-1-19981001/intorduction.html> p. 1-5, retrieved Jan. 5, 2006.*

"Wrapping legacy COBOL programs behind an XML-interface", H.M. Sneed; Proceedings Eighth Working Conference on Reverse Engineering; Stuttgart, Germany, Oct. 2-5, 2001; pp. 189-197, XP001061420; 2001, Los Alamitos, CA, USA, IEEE Comput. Soc. USA; ISBN: 0-7695-1303-4.

"Generation of stateless components from procedural programs for reuse in a distributed system", Proc of the 4th European Conference on Software Maintenance and Reengineering, 'Online! Feb. 29, 2000-Mar. 3, 2000; pp. 1-8, XP002210346.

"Querying XML Documents Made Easy: Nearest Concept Queries", A. Schmidt, M.L. Kersten and M. Windhouwer, Proc. of the 17th International Conf on Data Engineering, 'Online! Apr. 2-6, 2001, pp. 321-329, XP002200687.

"Automatic Patch Instruction Maker Program for the OS/2 Patch Utility", IBM Technical Disclosure Bulletin, IBM Corp. New York, US, vol. 33, No. 6A, Nov. 1, 1990, p. 203 XP000107688.

"Extending your markup: an XML tutorial"; IEEE Internet Computing, 'Online! Jul. 2000-Aug. 2000, pp. 74-79, XP002210347.

Coyle, "Legacy Integration—Changing Perspectives," *IEEE Software*, Mar./Apr. 2000, pp. 37-41.

Comella-Dorda, et al., "A Survey of Black-Box Modernization Approaches for Information Systems," © 2000 *IEEE*, pp. 173-183.

Chin, et al., "DECODE: A Co-operative Understanding Environment," *Software Maintenance Research and Practice*, vol. 8, 3-33 (1996), pp. 3-33.

Sneed, "Accessing Legacy Mainframe Applications via the Internet," Keynote for Web Site Evolution (WSE-2000), Zürich, Mar. 2000, *Reengineering Week*, 2000 Zürich/euroREF, pp. 1-13.

Desclaux, et al., "MACS: Maintenance Assistance Capability for Software, A K.A.D.M.E.," © 1991 *IEEE*, pp. 2-12.

Fritz, et al., "An Overview of Hierarchical Control Flow Graph Models," Proceedings of the 17th Conference on Winter Simulation, (1995), pp. 1347-1355.

Karpinski, "Databases, Tools Push XML Into Enterprise," internetweek.com, Nov. 16, 1998 (4 pages) http://www.internetwk.com/news1198/news111698-3.htm.

Shklar, "Web Access to Legacy Data," Tutorial Notes, The Fifth International WWW Conference '96, Paris, France, pp. 241-256, O'Reilly & Assoc., May 1996, http://www.cs.rutgers.edu/~shklar/papers/.

Verhoef, "Towards Automated Modification of Legacy Assets," Sep. 26, 1999, http://adam.wins.uva.nl/~x/ase/ase.html.

Cota, et al., "Control Flow Graphs as a Representation Language," Proceedings of the 26th Conference on Winter Simulation (1994) pp. 555-559.

Ballantyne, et al., "Method and System for Applying XML Schema," U.S. Appl. No. 09/522,277, filed Mar. 9, 2000.

Balalntyne, et al., "Method and System for Modeling a Legacy Computer System," U.S. Appl. No. 09/522,319, filed Mar. 9, 2000.

Shanmugasundaram; *Efficiently Publishing Relational Data as XML Documents*, 2000, pp. 65-76.

* cited by examiner

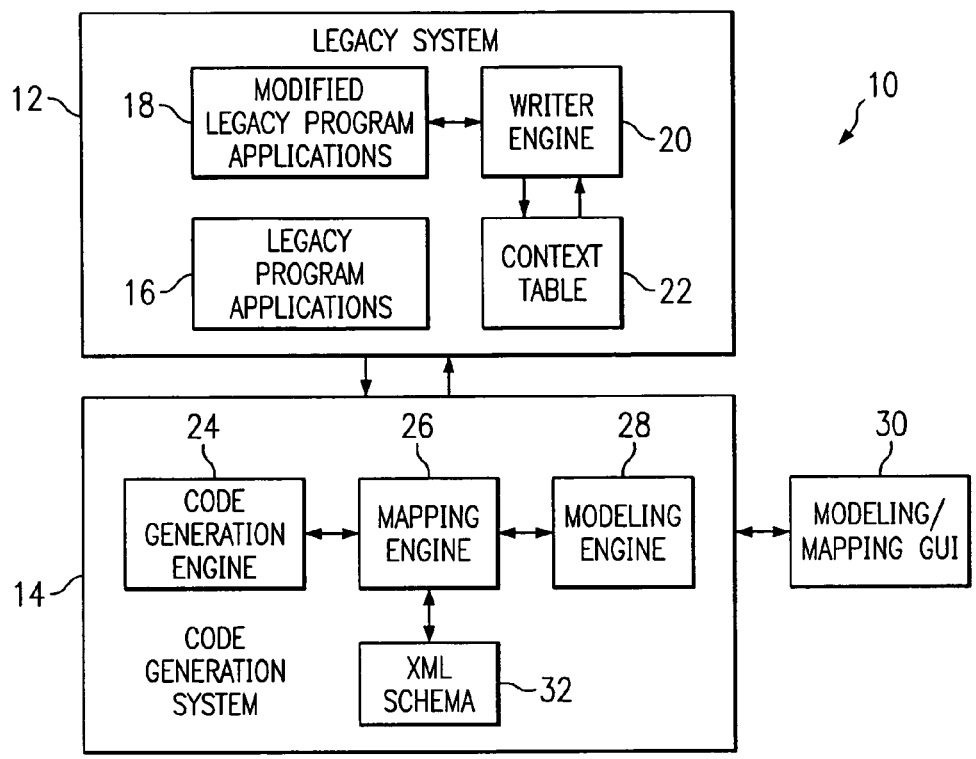
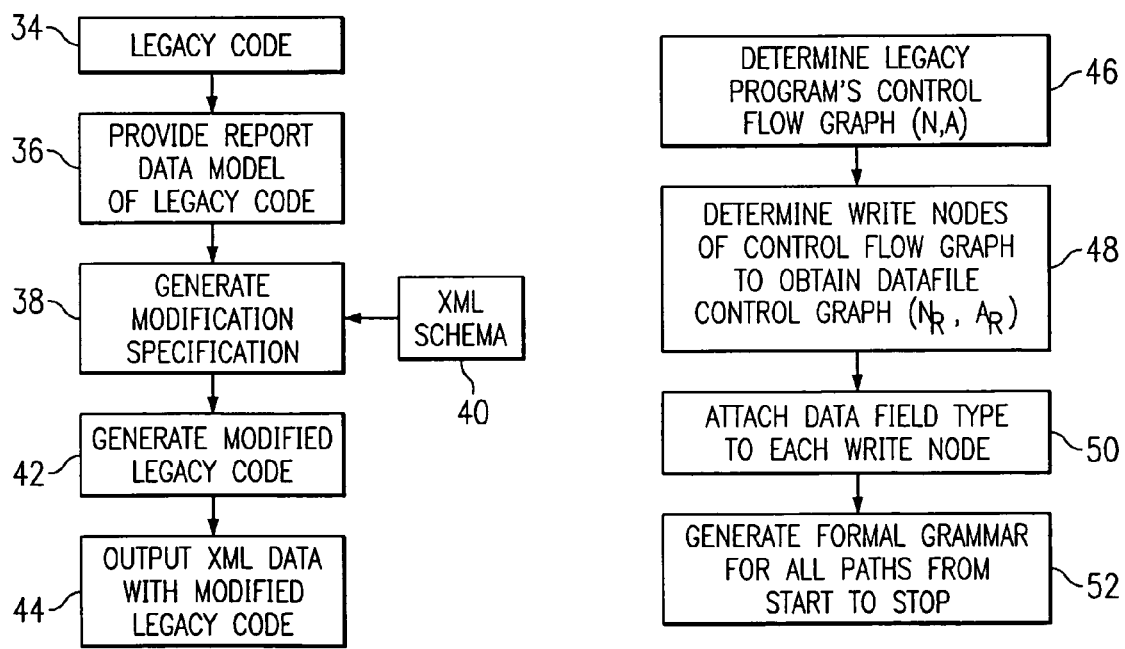
FIG. 1
FIG. 2
FIG. 3

Date 01/25/2000  American Telephone Company

Monthly Statement for Account Number: 1111111111
COMPANY: EDS

PHONE NUMBER: (214) 999-1212
PERSON: Suzie Q                Sample-Data

| Date | Time | Rate | Number | City and State | | Duration | Cost |
|---|---|---|---|---|---|---|---|
| 12/01/1999 | 07:15A | B | 210-404-6690 | San Antoni | TX | 00:12.2 | $1.22 |
| 12/02/1999 | 01:00A | A | 210-404-6690 | San Antoni | TX | 00:01.0 | $.05 |
| 12/02/1999 | 17:45P | D | 919-416-1212 | Kill Devil | NC | 00:00.3 | $.06 |
| 12/03/1999 | 15:01P | C | 210-404-6690 | San Antoni | TX | 00:02.0 | $.30 |
| 12/03/1999 | 20:23P | D | 919-462-1212 | Kill Devil | NC | 03:02.3 | $36.46 |
| 12/04/1999 | 06:06A | B | 615-655-1122 | Nashville | TN | 00:00.5 | $.05 |
| 12/07/1999 | 04:00A | A | 210-404-6690 | San Antoni | TX | 01:00.0 | $3.00 |
| 12/07/1999 | 15:05P | C | 615-655-1122 | Nashville | TN | 00:40.5 | $6.07 |
| 12/07/1999 | 15:45P | C | 205-555-1234 | Dothan | AL | 00:04.3 | $.64 |
| 12/11/1999 | 02:13A | A | 615-655-1122 | Nashville | TN | 00:30.0 | $1.50 |
| 12/11/1999 | 08:08A | B | 210-404-6690 | San Antoni | TX | 02:20.5 | $14.05 |
| 12/13/1999 | 08:00A | B | 210-404-6690 | San Antoni | TX | 01:50.0 | $11.00 |
| 12/21/1999 | 00:26A | A | 210-404-6690 | San Antoni | TX | 00:31.3 | $1.56 |
| 12/21/1999 | 04:12A | A | 919-416-1212 | Kill Devil | NC | 00:32.0 | $1.60 |
| 12/21/1999 | 18:23P | D | 615-655-1122 | Nashville | TN | 00:23.3 | $4.67 |
| 12/21/1999 | 19:01P | D | 210-404-6690 | San Antoni | TX | 03:02.4 | $36.48 |
| 12/22/1999 | 08:04A | B | 205-555-1234 | Dothan | AL | 00:43.2 | $4.32 |
| 12/27/1999 | 12:01A | C | 205-555-1234 | Dothan | AL | 00:13.6 | $2.04 |
| 12/27/1999 | 21:12P | D | 205-555-1234 | Dothan | AL | 01:03.0 | $12.60 |

TOTAL CALLS: 19                    TOTAL TIME: 16:12:49   $137.67

FIG. 4

```
<bill>
    <account>1111111111</account>
    <customer-name>EDS</customer-name>
    <calling-date>1/billing-date26/2000><//>
    <total-bill-by-phone>69.66</total-bill-by-phone>
    <total-time-by-phone>515.6</total-time-by-phone>
    <total-calls>34</total-calls>
    <detail-list>
        <detail-by-phone>
            <phone-number>999-1212</phone-number>
            <area-code>214</area-code>
            <phone-user>Suzie Q Sample-Data</phone-user>
            <calls-by-phone>
              <call>
                  <date>12-01-1999</date>
                  <time>07.15A/time>
                  <code>B</code>
                  <phone-number>404-6690</phone-number>
                  <area-code>210</area-code>
                  <called-city>San Antonio</called-city>
                  <called-state>TX</called-state>
                  <duration>12.2</duration>
                  <charge>1.22</charge>
              </call>
              <call>
                  <date>12-01-1999</date>
                  <time>01.00A</time>
                  <code>A</code>
                  <phone-number>404-6690</phone-number>
                  <area-code>210</area-code>
                  <called-city>San Antonio</called-city>
                  <called-state>TX</called-state>
                  <duration>01.0</duration>
                  <charge>0.05</charge>
              </call>
              <call>
                  <date>12-01-1999</date>
                  <time>17.45P</time>
                  <code>D</code>
                  <phone-number>416-1212</phone-number>
                  <area-code>919</area-code>
                  <called-city>Kill Devil</called-city>
                  <called-state>NC</called-state>
                  <duration>0.3</duration>
                  <charge>0.06</charge>
              </call>
            </calls-by-phone>
            ...
        </detail-by-phone>
        ...
    </detail-list>
</bill>
```

*FIG. 5*

```
<Schema xmlns="urn: schemas-microsoft-com:xml-data"
  xmlns:dt="urn:schemas-microsoft-com:datatypes">
<ElementType name="accountno" content="textonly"/>
<ElementType name="customer-name" content="textonly"/>
<ElementType name="billing-date" content="textonly"/>
<ElementType name="total-cost" content="textonly"/>
<ElementType name="total-number-calls" content="textonly"/>
<ElementType name="total-time" content="textonly"/>
<ElementType name="phone-number" content="textonly"/>
<ElementType name="phone-user" content="textonly"/>
<ElementType name="date" content="textonly"/>
<ElementType name="charge" content="textonly"/>
<ElementType name="called-city" content="textonly"/>
<ElementType name="called-state" content="textonly"/>
<ElementType name="duration" content="textonly"/>
<ElementType name="code" content="textonly"/>
<ElementType name="area-code" content="textonly"/>
<ElementType name="time" content="textonly"/>
<ElementType name="call">
   <element type="area-code" maxOccurs="1" />
   <element type="phone-number" maxOccurs="1" />
   <element type="code" maxOccurs="1" />
   <element type="date" maxOccurs="1" />
   <element type="time" maxOccurs="1" />
   <element type="duration" maxOccurs="1" />
   <element type="charge" maxOccurs="1" />
   <element type="called-city" maxOccurs="1" />
   <element type="called-state" maxOccurs="1" />
</ElementType>
<ElementType name="total-bill-by-phone" content="textonly"/>
<ElementType name="total-time-by-phone" content="textonly"/>
<ElementType name="total-calls-by-phone" content="textonly"/>
<ElementType name="calls-by-phone">
   <ElementType name="call"/>
</ElementType>
<ElementType name="detail-by-phone">
   <element type="phone-number"/>
   <element type="area-code"/>
   <element type="phone-user"/>
   <element type="total-bill-by-phone"/>
   <element type="total-time-by-phone"/>
   <element type="total-calls-by-phone"/>
   <element type="calls-by-phone"/>
</ElementType>
<ElementType name="detail-list">
   <element type="detail-by-phone"/>
</ElementType>
<ElementType name="bill">
   <element type="accountno"/>
   <element type="customer-name"/>
   <element type="billing-date"/>
   <element type="total-cost"/>
   <element type="total-number-calls"/>
   <element type="total-time"/>
   <element type="detail-list"/>
</ElementType>
</Schema>
```

*FIG. 5A*

```
┌─ Source File Viewer ─────────────────────────────────────────── _ □ × ┐
│ ┌──────────────────────────────────────────────────────┐  ┌───────┐  │
│ │ D:\xml-annotation\XML Annotator\Sample Data\cobol\phonebill.cbl │  │ Close │  │
│ └──────────────────────────────────────────────────────┘  └───────┘  │
│                            ┌──────┐ ┌──────┐ ┌──────┐                │
│                            │ Find │ │ Text1│ │ 520  │                │
│                            └──────┘ └──────┘ └──────┘                │
│ 56900  *                                                             │
│ 57000  /*******************************************************      │
│ 57100  *                       SORT                            *     │
│ 57200  *********************************************************     │
│ 57300  *BUILD-SORT-TEMP-FILE.                                        │
│ 57400  * BUILD TEMPFILE HERE.                                        │
│ 57500  *                                                             │
│ 57600  /*******************************************************      │
│ 57700  *                    TERMINATION                        *     │
│ 57800  *********************************************************     │
│ 57900  TERMINATION.                                                  │
│ 58000     PERFORM PRINT-A-CONTROL-BREAK-2.              94188JHA     │
│ 58100     MOVE RECORDS-SELECTED-TOTAL TO RECORDS-SELECTED-EDIT. 94190JHA │
│ 58200     ADD 1                    TO PAGE-COUNT.                    │
│ 58300     MOVE PAGE-COUNT           TO REPORT-PAGE-NO.               │
│ 58400     WRITE PRTREC   FROM R1-TITLE  AFTER ADVANCING PAGE.  00003JHA │
│ 58500     MOVE "GRAND TOTAL:"       TO RS-MSG.                       │
│ 58600     MOVE GT-DURATION          TO HOLD-DURATION.                │
│ 58700     PERFORM ACCUM-DURATION.                                    │
│ 58800     MOVE WS-HH                TO RS-HH.                        │
│ 58900     MOVE WS-MM                TO RS-MM.                        │
│ 59000     MOVE WS-SS                TO RS-SS.                        │
│ 59100     MOVE GT-COST              TO RS-COST.                      │
│ 59200     WRITE PRTREC FROM RS-LINE AFTER ADVANCING 5 LINES.         │
│ 59300     CLOSE TEMPFILE.                                            │
│ 59400     CLOSE PRINT.                                               │
│ 59500  *                                                             │
│ 59600  /*************************************************94190JHA    │
│ 59700  *             DURATION COMPUTATION AREA           *94190JHA   │
└──────────────────────────────────────────────────────────────────────┘
```

*FIG. 6A*

```
<Schema xmlns="urn:schemas-microsoft-com:xml-data"
    xmlns:dt="urn:schemas-microsoft-com:datatypes">
<AttributeType name="Current" content="boolean"/>
<ElementType name='Name" content="textonly"/>
<ElementType name="ID" content="textonly"/>
<ElementType name="Street" content="textonly"/>
<ElementType name="City" content="textonly"/>
<ElementType name="State" content="textonly"/>
<ElementType name="ZIP" content="textonly"/>
<ElementType name="Address">
    <Attribute type="Current"/>
    <Element type="Street"/>
    <Element type="City"/>
    <Element type="State"/>
    <Element type="ZIP"/>
</ElementType>
<ElementType name="Customer">
    <Element type="Name"/>
    <Element type="Address"/>
    <Element type="ID"/>
</ElementType>
</Schema>
```

FIG. 7

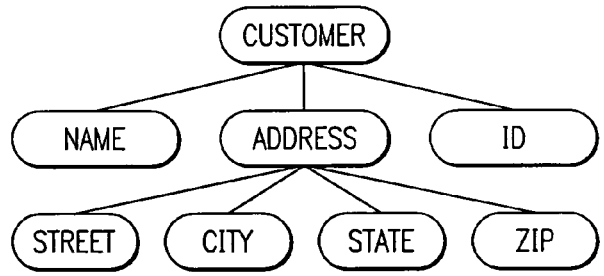

FIG. 7A

| ID | LABEL | END LABEL | DEPTH | PARENT | CARDINALITY |
|---|---|---|---|---|---|
| 1 | <Customer> | </Customer> | 1 | 0 | n |
| 2 | <Name> | </Name> | 2 | 1 | 1 |
| 3 | <Address> | </Address> | 2 | 1 | 1 |
| 4 | <ID> | </ID> | 2 | 1 | 1 |
| 5 | <Street> | </Street> | 3 | 3 | 1 |
| 6 | <City> | </City> | 3 | 3 | 1 |
| 7 | <State> | </State> | 3 | 3 | 1 |
| 8 | <ZIP> | </ZIP> | 3 | 3 | 1 |

FIG. 7B

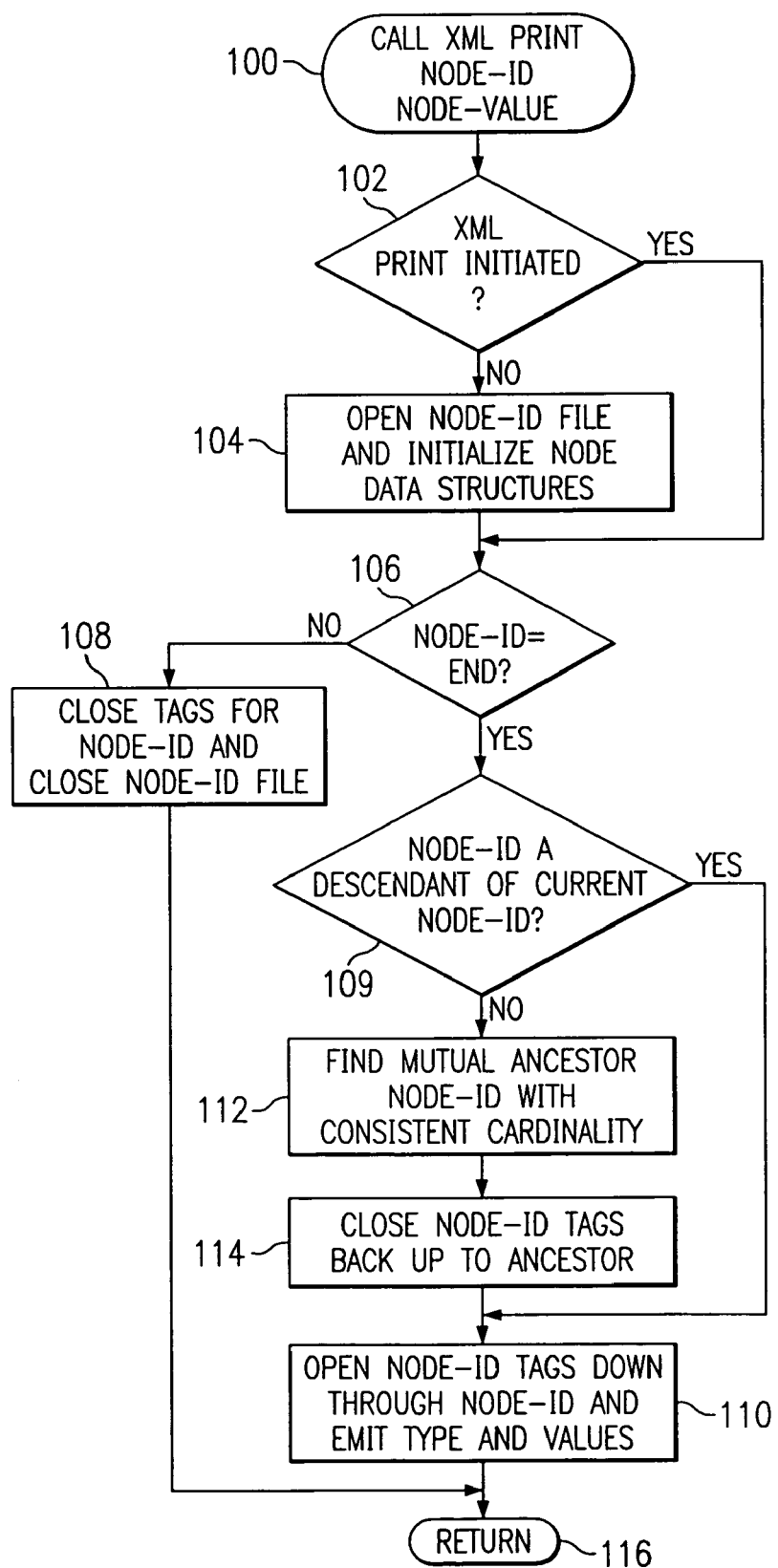

METHOD AND SYSTEM FOR REPORTING XML DATA BASED ON PRECOMPUTED CONTEXT AND A DOCUMENT OBJECT MODEL

CROSS REFERENCE TO RELATED APPLICATIONS

This application is a continuation in part of U.S. patent application Ser. No. 09/522,277, entitled METHOD AND SYSTEM FOR REPORTING XML DATA FROM A LEGACY COMPUTER SYSTEM, by Ballantyne, et al., filed on Mar. 9, 2000 and assigned to Electronic Data Systems Corporation.

TECHNICAL FIELD

This invention relates in general to the field of computer systems, and more particularly a method and system for reporting XML data from a computer system, such as a legacy computer system, based on precomputed context and a document object model.

BACKGROUND OF THE INVENTION

The Internet and e-commerce are rapidly reshaping the way that the world does business. In addition to direct purchases made through the Internet, consumers increasingly depend upon information available through the Internet to make purchasing decisions. Businesses have responded by allowing greater access of information through the Internet both directly to consumers and to other businesses such as suppliers. One result of the increased access to electronic information through the Internet is a decreased dependency and desire for printed "hard copy" information.

Extensible Mark-up Language ("XML") provides an excellent tool for business-to-business electronic commerce and publication of data via the Internet. XML specifies a format that is easily adapted for data transmission over the Internet, direct transfer as an object between different applications, or the direct display and manipulation of data via browser technology. Currently, complex transformations are performed on data output in legacy computer system formats in order to put the data in XML format.

One example of the transformation from written reports typically output by legacy computer systems to electronic reports is the telephone bill. Historically, telephone companies have relied on mainframe or legacy computer systems running COBOL code to track and report telephone call billing information. Typically, these legacy computer system reports are printed, copied and distributed to those who need the information. However, conventional legacy computer system report formats are difficult to transmit or manipulate electronically. Yet, the electronic distribution of bills, such as through e-mail, a biller's web site or at a bill consolidator chosen by the consumer, enhances flexibility and control of bill payment, especially with complex business invoices.

Generally, in order to make conventional legacy reports available in different formats, a complex transformation of the data is performed based on a report print stream. One transformation technique is to write a "wrapper" around the legacy computer system. The wrapper includes parsers and generators that transform legacy computer system reports into XML formatted output. Parsers apply a variety of rules to identify and tag data output in a legacy report. For example, a parser might determine that a data field of a telephone bill represents a dollar amount based on the presence of a dollar sign or the location of a decimal point in the data field, or that a data field represents a customer name due to absence of numbers. Once the parser deciphers the legacy report, a generator transforms the legacy computer system data into appropriately tagged XML format.

Although the end result of the parsing and transforming process is data in an XML format, the process itself is difficult and expensive to implement and cumbersome to maintain. Without careful study of underlying program logic, it is generally not possible to reliably determine all potential outputs from the legacy computer system. In particular, even a fairly large output sample is almost certain to be incomplete in that some program logic is only rarely exercised. Another difficulty with the parsing and transforming process is that, as changes are made to the underlying program applications of the legacy computer system, the parsing and transforming systems generally require updates that mirror the underlying changes. These downstream changes increase the time and expense associated with maintaining the legacy computer system, and also increase the likelihood of errors being introduced into the XML formatted output.

Another difficulty associated with the use of XML is that, although XML dramatically improves the utility of output data, the generation of XML output depends upon underlying programs that adhere to an exacting data structure. For instance, the generation of syntactically correct XML requires adherence to a rigid labeled tree structure so that output data is identified by "tags" and "end tags" associated with the XML data structure as defined by an XML schema. When writing a deeply embedded element of an XML tree, such as a subschema within a defined XML schema, tags corresponding to all of that element's ancestor elements must also be written. When writing another element, not part of a current XML subschema, the current subschema must be closed off to an appropriate level with balancing closing end tags for the ancestor elements. XML schema also specify type and cardinality constraints on their elements. Thus, substantial and exacting bookkeeping of programs that output XML is necessary with respect to the XML schema in order to minimize errors on the part of programmers.

One particular application of XML that has gained acceptance is the Document Object Model ("DOM") created by the World Wide Web Consortium ("W3C"). DOM is a platform-neutral and language-neutral interface that allows programs to dynamically access and update content, structure and style of documents. Commercial packages are available that provide DOM application programming interfaces ("APIs") and that provide Extensible Stylesheet Language ("XSL") and XSL Transformation ("XSLT") tools to modify an XML DOM according to XSL and XSLT templates.

The DOM includes a standard set of methods for manipulating DOM elements. Generation of a DOM instance satisfying an XML schema generally requires a step-by-step construction of each node in the DOM tree so that all parent elements are created along with embedded elements of an XML tree. If an element is added that is not part of the current subschema, the DOM tree generally must be traversed to an appropriate ancestor node with new descendents of the node created to establish a correct context. Thus, substantial and exacting bookkeeping for DOM construction is necessary in order to minimize errors on the part of programmers.

SUMMARY OF THE INVENTION

Therefore, a need has arisen for a method and system which rapidly and automatically modifies legacy computer systems to produce output in an XML format.

A further need exists for a method and system which modifies legacy computer systems to produce output in XML format without altering the underlying legacy computer system program logic or business rules.

A further need exists for a method and system which determines write operations of a legacy computer system to allow modification of those nodes so that the legacy computer system outputs data in XML format.

A further need exists for a method and system which generates syntactically correct XML output with automated bookkeeping to minimize programming errors.

A further need exists for a method and system which generates synatactically correct XML output by constructing a DOM to create an XML data structure, such as with the modification of legacy code.

In accordance with the present invention, a method and system is provided that substantially eliminates or reduces disadvantages and problems associated with previously developed methods and systems that transform the output from legacy computer systems into an XML format. The present invention provides XML output by modifying the underlying legacy computer system program applications to report data in XML format instead of transforming the output from the legacy computer system after the data is reported in the format of the legacy computer system.

More specifically, a code generation engine automatically modifies legacy computer system program applications to create modified legacy program applications. The modified legacy program applications are run on the legacy computer system so that the data output from the legacy computer system is in XML format. The modified legacy program applications are written in the computer language of the legacy computer system so that the legacy computer system directly produces an XML version of its output without the need to alter the logic or business rules embodied in the unmodified program applications of the legacy computer system.

The code generation engine creates the modified program applications in accordance with a modification specification created by a mapping engine. The mapping engine generates the modification specification and context table by mapping a model of write operations of the legacy computer system to an XML schema. The mapping engine provides the modification specification to the code generation engine. The code generation engine creates modified legacy computer system program applications for use on the legacy computer system. A writer engine is an application program loaded on the legacy computer system and written in the language of the legacy computer system. The writer engine is called by the modified program applications to write XML output in the format of the XML schema encoded by the context table.

The model used by the mapping engine is generated by a modeling engine which analyzes the legacy computer system to identify and model the write operations, such as with a report data model. The modeling engine determines a list of legacy computer system program applications that report data. The program applications that report data are further analyzed to determine the incidents within each program application at which a write operation exists. A report data model is then compiled with a value and/or type for the data fields of each incident. The report data model is augmented by a formal grammar that simplifies the process of relating write operations to execution paths of legacy computer system program applications.

Once the modified program application is loaded on the legacy computer system, the legacy computer system continues to perform its functional operations without change to the underlying business or program logic. When a legacy computer system program application commands the reporting of data, modified instructions provided in the modified program application call the writer engine to output syntactically correct XML data. The writer engine determines the current context of XML output and opens appropriate schema element data structures in conjunction with the context table. The writer engine then analyzes the current schema element data structure and the called schema element to determine the relationship of the called schema element with the current schema element. If the called schema element is a descendant of the current schema element, the writer engine opens the schema element ID tags down through the called schema element and outputs the data from the schema element in syntactically correct XML format. If the schema element is not a descendant of the current schema element, the writer engine finds a mutual ancestor having consistent cardinality, closes the schema element ID tags up to the ancestor schema element and proceeds to open the schema element ID tags down through the called schema element to output data in syntactically correct XML format. In addition, the writer engine supports delayed printing of tags and attributes until such time as a complete syntactic unit is available.

In one embodiment, a target DOM is built and XML emitted once the building of the entire target DOM is complete. An API writes XML by generating an intermediate instance of the DOM, and then outputs directly from the DOM with the possible application of a stylesheet transformation. The API buffers XML data in an arbitrary number of contexts that are simultaneously active so that any call to the API may operate on any node of the DOM structure. By building the whole DOM instance before outputting any XML, the API can manipulate a node of the DOM instance created arbitrarily far back in a sequence of API calls. In addition, a DOM instance may be re-structured by application of an XSLT stylesheet to output a particular XML schema data structure.

More specifically, when a legacy computer system program application commands the reporting of data, modified instructions provided in the modified program application call the writer engine to populate a DOM object with structurally correct XML data. The writer engine uses either the current context of the XML DOM or another context supplied as an argument to the API call and opens appropriate schema element data structures in conjunction with the context table. The writer engine analyzes the current schema element data structure and the called schema element to determine the relationship of the called schema element with the current schema element. If the called schema element is a descendant of the current schema element, the writer engine inserts the schema element nodes down through the called schema element and constructs the element node with the data from the schema element. If the schema element is not a descendant of the current schema element, the writer engine finds the minimal mutual ancestor having consistent cardinality, traverses the schema element nodes up to the ancestor schema element and proceeds to insert the schema element nodes down through the called schema element to construct the element node. In addition, the writer engine supports capture of attributes and their values.

The present invention provides a number of important technical advantages. One important technical advantage is the ability to rapidly and automatically modify legacy computer system program applications to enable them to directly produce an XML version of their data output. By modifying the underlying legacy computer system program applications, XML output is made available directly from the legacy computer system without a transformation of the data itself from a legacy computer system format. Further, the underlying program logic and business rules remain unaltered so that the substantive functions of the legacy computer system need not change. Thus, a business enterprise using a legacy computer system is provided with the greater accessibility to data provided by output in XML format without affecting computed values.

Another important technical advantage of the present invention is that modification of the underlying legacy computer program applications is operationally less expensive, complex and time-consuming than transformation of legacy computer system output to an XML format. For instance, once modified program applications are running on the legacy computer system, XML formatted output is available without further action to the data. By comparison, transformation of output to an XML format after the data is reported by the legacy computer system requires action with each data report. Thus, if any changes are made to the underlying legacy program applications, changes must also generally be made to transformation applications that mirror the underlying changes. This further complicates the maintenance of the legacy computer system.

Another important technical advantage of the present invention is that, whether or not used with a legacy computer system, the writer engine and context table aid in the generation of syntactically correct XML output. For instance, the writer engine ensures that a command to write an embedded XML element will include tags corresponding to all of the embedded element's ancestor elements. Also, when an XML element is written that is not part of the current XML subschema, the writer engine will close off the current XML subschema to an appropriate level of an ancestor schema element. Automation of the bookkeeping involved with the XML schema eliminates the risk of syntactic errors associated with XML reports. The delayed printing feature provides a mechanism whereby a program can generate correct XML data even when the sequence of print commands in the original legacy system application program does not map directly onto the order of XML elements prescribed by the XML schema.

Another important advantage of the present invention is that tool support manages the complexity of modeling the underlying program logic, resulting in substantially reduced time and expense for modification of a legacy computer system to output XML formatted data. Tools aid in: the determination of the control flow graph of legacy applications; the abstraction out of this graph of a subgraph specifically related to the writing of report lines; the identification of constants and data items that flow into print lines so that the elements that need to be written as tagged XML can be readily identified; and the identification of domain specific information such as locations of headers and footers. Automation through tool support greatly enhances management of program complexity.

Another important technical advantage of the present invention is provided by the automated generation of data structures from XML schema and context sensitive DOM creation. For instance, this results in more rapid development for new code and more rapid revision for existing legacy code to output XML data. Further, the opportunity for errors is decreased due to automated adherence to the XML schema requirements. Also, the facilitation of in situ generation of XML from a legacy computer system is enhanced so that output of a target schema is enabled even if significantly different from the natural structure of the output implied by an underlying legacy computer system.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIG. 1 depicts a block diagram of a code generation system in communication with a legacy computer system;

FIG. 2 depicts a flow diagram of the generation of modified legacy program applications to output XML data;

FIG. 3 depicts a flow diagram of the generation of a model of the write operations of a legacy program application;

FIG. 4 depicts a sample output of a legacy computer system report for a telephone bill;

FIG. 5 depicts XML formatted data corresponding to the legacy computer system report depicted by FIG. 4;

FIG. 5A depicts an XML schema for the output depicted in FIG. 5;

FIG. 6A depicts underlying COBOL code modeled by the report data model of FIG. 6;

FIG. 7 depicts a sample Extensible Markup Language schema for outputting address data;

FIG. 7A depicts a tree structure for the schema of FIG. 7;

FIG. 7B depicts a computed data context table for the schema depicted by FIG. 7; and FIG. 8 depicts a flow diagram of an XML print operation that ensures generation of syntactically correct Extensible Markup Language data output.

DETAILED DESCRIPTION OF THE INVENTION

Figure 6:
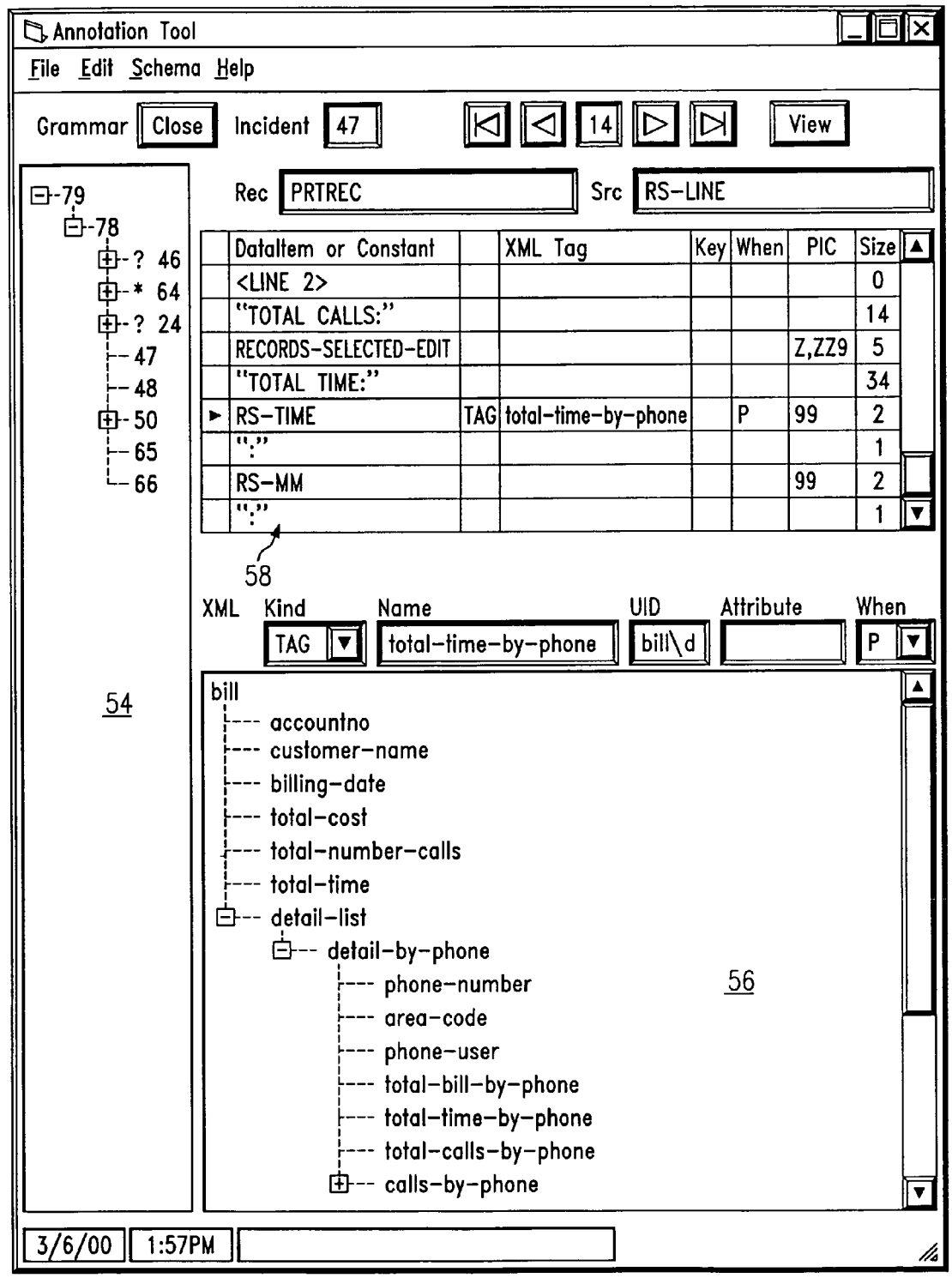
FIG. 6 depicts a graphical user interface for mapping legacy computer system code to an Extensible Markup Language schema and report data model.

Preferred embodiments of the present invention are illustrated in the figures, like numeral being used to refer to like and corresponding parts of the various drawings.

In order to take advantage of the opportunities provided by the use of XML as a medium for e-commerce, businesses will eventually have to either replace existing legacy computer systems or re-write the applications on the legacy computer systems. However, businesses have substantial investments in their existing legacy computer systems and related applications so that wholesale replacement of these systems and applications is not practical in the short term. Legacy computer systems perform essential functions such as billing, inventory control, and scheduling that need massive on-line and batch transaction processing. Legacy computer system applications written in languages such as COBOL remain a vital part of the enterprise applications of many large organizations for the foreseeable future. In fact, this installed base of existing software represents the principal embodiment of many organizations' business rules. Although, in principle, these applications could be hand-modified to output data in XML format, in reality the underlying logic of even a simple report application can be difficult to understand and decipher.

Therefore, a tremendous challenge facing many businesses is the rapid and inexpensive adaptation of existing computer systems to take advantage of the opportunities presented by electronic commerce. Even when installing new and updated computer systems, the ever-evolving nature of electronic commerce demands that businesses incorporate flexibility as a key component for new computer systems. XML has become a popular choice for reporting data due to the ease with which XML adapts to essential e-commerce functions, such as transmission over the Internet, direct transfer as an object between different applications and display and manipulation via browser technology. XML's flexibility results from its inclusion of named tags bracketing data that identify the data's relationship within an XML schema. However, implementation of XML data reports relies on accurate use of tags to define the output data within the XML schema. Thus, computer systems that implement XML adhere to the XML schema and use exact bookkeeping to obtain accurate reports.

The present invention aids in the implementation of XML for reports, both by the modification of legacy computer system program applications to output XML data and by the tracking of XML output within an XML schema to ensure an accurate output, whether or not the XML data originates with a legacy computer system. Referring now to FIG. 1, a block diagram depicts a computer system 10 that modifies a legacy computer system 12 to output data in XML format. A code generation system 14 interfaces with legacy computer system 12 to allow the analysis of one or more legacy program applications 16 and the generation of one or more modified legacy program applications 18. Code generation system 14 also provides a writer engine 20 and context table 22 to legacy computer system 12. Legacy computer system 12 is then able to directly output XML formatted data when modified legacy program applications 18 call writer engine 20 in cooperation with context table 22 to output syntactically correct XML data.

Code generation system 14 includes a code generation engine 24, a mapping engine 26 and a modeling engine 28. Modeling engine 28 interfaces with legacy computer system 12 to obtain a copy of legacy program applications 16 for automated review and modeling. Modeling engine 28 generates a list of incidents for points in the program at which data is written. For instance, modeling engine 28 may search the source code of the legacy program applications for reporting or writing commands for selected output streams. The list of report incidents are used to model the report functions of the legacy computer system such as by a report data model that lists the values and types of written data fields from the legacy program applications 16. The list of report incidents is then augmented by a formal grammar that is used to relate the XML schema to the output reported by the legacy program applications. The list of report incidents and the formal grammar are two components of the report data model for the legacy system application program. Intuitively, an incident describes a line in a report, and the formal grammar describes how the application program sequences those lines to form a report.

Modeling engine 28 provides the report data model identifying report incidents in the legacy program applications 16 to mapping engine 26 and modeling/mapping graphical user interface 30. Mapping engine 26 maps the report incidents from the report data model to the XML schema 32 and this relationship between the report data model and XML schema 32 is displayed on modeling/mapping graphical user interface 30. By establishing the relationship between the report incidents of legacy program application 16 and the XML schema 32, mapping engine 26 defines a specification for modification of the legacy program applications 16 to output XML data. Modeling/mapping graphical user interface 30 provides information to programmers of the modification specification. Modeling/mapping graphical user interface 30 produces a modification specification and a context table 22. Optionally, the modeling/mapping graphical user interface 30 allows programmers to create or modify an XML schema.

Code generation engine 24 accepts the modification specification, a copy of the legacy program applications 16, and context table 22 to generate modified legacy program applications 18. Based on the modification specification, code generation engine 24 generates source code in the computer language of the legacy computer system that is inserted in legacy program applications 16 to command output of XML data and saves the modified source code as modified legacy program applications 18. The modified legacy program applications 18 may continue to maintain the legacy computer system report instructions so that the modified program applications 18 continue to report data in the legacy computer system format in addition to the XML format. The outputting of both formats aids in quality control by allowing a direct comparison of data from modified and unmodified code. Alternatively, the modified instructions provided by code generation engine 24 may replace report instructions of legacy program applications 16 so that modified legacy program applications 18 report data exclusively in XML format. Writer engine 20 is written in a computer language of legacy computer system 12 and references context table 22 to determine the appropriate XML schema elements for output of data from legacy system 12. The modified code in modified legacy program applications 18 calls writer engine 20 when outputting data in XML format.

Referring now to FIG. 2, a simplified flow diagram depicts the process of generation of modified legacy program applications that output data in XML format. The process begins at step 34 in which the legacy code of the legacy program applications 16 is made available to code generation system 14. For example, a mainframe legacy computer system running COBOL source code downloads a copy of the source code to code generation system 14 for analysis and generation of modified code.

At step 36, code generation system 14 models the legacy program applications to provide a report data model of the write incidents and their underlying grammar from the legacy program applications' code. For instance, a report data model identifies the incidents within the code of legacy program applications 16 at which data to selected output devices are written, including the values and types of the data. At step 38, the report data model is used to generate a modification specification. The modification specification is generated in conjunction with an XML schema provided at step 40 that defines the data structure for write instructions of the modified legacy program applications 18 to output XML data.

At step 42, the modification specification is used to automatically generate modified legacy code to be run on the legacy computer system 12. The modified legacy code is run at step 44 so that the modified legacy program applications emit output from legacy system 12 in XML format without requiring further transformation of the output data.

The process of modeling legacy computer system 12 is shown in greater detail by reference to FIG. 3. Modeling engine 28 extracts a report data model of legacy program applications 16 through an automated analysis of the underlying legacy code. The automated analysis provides improved understanding of the operation of the legacy code and reduces the likelihood of errors regarding the operation and maintenance of the underlying legacy code. Essentially, modeling engine 28 parses the legacy software process into rules to graph its control flow. An abstraction of the control flow produces a report data model that allows understanding of data types and invariant data values written at each write instruction in the report data model. The report data model, when combined with the values and typing of written data fields, provides a model of legacy program applications 16.

Referring to FIG. 3, the modeling process starts at step 46 through a determination of the legacy programs' control flow graph. The control flow graph of a particular legacy program application is a directed graph (N, A) in which N contains a node for each execution point of the program application and A contains an arc $<n_1, n_2>$, where $n_1$ and $n_2$ are elements of N, if the legacy program application is able to move immediately from $n_1$ to $n_2$ for some possible execution state.

At step 48, the write operations of the control flow graph are determined to obtain a data file control graph. Essentially, the control flow graph is abstracted to contain only start nodes, stop nodes, and nodes writing to selected data files. This results in a data file control graph that identifies the write incidents in the legacy program applications. The data file control graph abstracted from a control flow graph (N, A) is a directed graph $(N_R, A_R)$ A node n is in the set of nodes $N_R$ if the node n starts a legacy program application, stops a legacy program application or writes to a data file. The arc $<n_1, n_m>$ is in $A_R$ if both $n_1$ and $n_m$ are in the set of nodes $N_R$ and a sequence of arcs $<n_1, n_2>, <n_2, n_3>, \ldots <n_{m-1}, n_m>$) exists in A where, for i from 2 to m−1, $n_i$ is not in the set of nodes $N_R$.

Once the data file control graph is completed, at step 50, information about the data written at each data file write node is attached to the data file control graph. For instance, the values or the type of each data field written by each node are statically determined via data flow in the control flow graph and are attached to the nodes of the data file control graph.

At step 52, the paths from the start nodes through the data file control graph to the stop nodes are represented in a formal grammar. This formal grammar with the attached data field information form the report data model. This model is an abstract representation of the data files that can be written by the legacy program applications and provides the basis on which a modification specification can be written.

The report data model is presented in two parts. First, each write node with its attached data field information is presented as an incident. These incidents are the most basic or leaf sub-expressions of the report data model. Second, the non-leaf sub-expressions of the report data model are presented as rules hierarchically building up from the incidents.

The generation and presentation of a report data model of legacy program applications may be illustrated by consideration of a telephone bill example. FIG. 4 depicts the printed output from a COBOL program for a telephone bill. A typical COBOL program prints the telephone bill in a predetermined format that may include, for example, predetermined paper sizes and column dimensions. The printing of the "TOTAL CALLS" line in FIG. 4 is the result of a computation of the total number of calls, total time of the calls and the total cost of the calls. As an example of a single node of a control flow graph, the incident derived from COBOL code for outputting the total calls line of FIG. 4 is as follows:

```
Incident 47 loc 414 record PRTEC from RS-LINE
            <LINE 2>
     0:     "   TOTAL CALLS:"
    14:     RECORDS-SELECTED-EDIT loc 266 pic Z,ZZ9 size 5
    19:     "        TOTAL TIME:   "
    53:     RS-HH loc 270 pic 99 size 2
    55:     ":"
    56:     RS-MM loc 272 pic 99 size 2
    58:     ":"
    59:     RS-SS loc 274 pic 99 size 2
    61:     "   "
    63:     RS-COST loc 276 pic $$$$$.99 size 8
    71:     "   "
```

Incident 47 describes the data written at the appropriate point in the program by the write instruction at line 414. The data include the headings of "TOTAL CALLS" and "TOTAL TIME" followed by the accumulated values for the total number of calls, the total time of calls and the total cost of calls. The constant values "TOTAL CALLS" and "TOTAL TIME" are determined by data flow analysis of the legacy application program.

The report data model includes grammar rules built up from the write incidents. Once each grammar rule is defined from the appropriate incidents and sub-rules, a report grammar describing the potential output of the legacy program applications for the bill shown in FIG. 4 is generated as follows:

```
Rule 23      [seq 3 4 5 6 7 8 9 10]
Rule 24      [? 23]
Rule 41      [seq 23 24 25]
Rule 42      [?41]
Rule 45      [seq 0 1 2 42]
Rule 46      [? 45]
Rule 50      [seq 24 49]
Rule 51      [?50]
Rule 61      [seq 24 47 48 51 23]
Rule 62      [? 61]
Rule 63      [seq 62 24 25]
Rule 64      [*63]
Rule 78      [seq 46 64 24 47 48 50 65 66]
Root 79      [seq 78]
```

These grammar rules show how the write incidents are combined to represent the output written by the legacy application program. For example, rule 61 consists of the sequence of sub-rules and incidents 24, 47, 48, 51, and 23. Data described by each sub-rule or incident is followed sequentially in the data file by the data described by the next sub-rule or incident. That is, in rule 61, data described by incident 47 is followed immediately by data described by incident 48. Rule 62 is a conditional rule indicating that data described by 61 may be written to the data file or skipped entirely. Rule 64 is a repeating rule indicating that there is data described by rule 63 that is repeated zero or more times.

Referring now to FIG. 5, data formatted according to the XML schema of FIG. 5A is depicted that provides a data structure for the legacy computer output of FIG. 4. The data falls within an opening tag of "<bill>" and a closing tag of "</bill>". The "bill" schema includes a "detail-list" subschema that, in turn, includes a "detail-by-phone" subschema. Within the "detail-by-phone" subschema separate tags are defined that report the data from the TOTAL CALLS line of FIG. 4. The "total-bill-by-phone" subschema, the "total-time-by-phone" subschema and the "total-calls" subschema define the data printed in the TOTAL CALLS line of the legacy computer system output.

FIG. 5A depicts the XML bill schema used to output the data in FIG. 5. The root element of the schema is the element type named "bill". Its subschemas are types of the subelements. The detail-by-phone subschema of the detail-list subschema of bill includes the data structure reported in the TOTAL CALLS line of FIG. 4.

Referring now to FIG. 6, one example of a display by the modeling/mapping graphical user interface 30 illustrates the mapping relationship between the XML schema, the report data model and the underlying legacy computer program application depicted as COBOL code in FIG. 6a. A grammar window 54 lists the report data model grammar rules provided by the report data model of the legacy program applications. An XML schema window 56 depicts the XML schema depicted by FIG. 5 that is representative of the legacy computer system output depicted by FIG. 4. A mapping window 58 depicts the relationship between the variables of the legacy program applications and the XML tags of the XML schema. For instance, RS-TIME is a COBOL variable that is mapped to the "total-time" tag of the XML schema. Rule 79 represents the root or beginning of the grammar provided by the report data model shown above. Within the grammar window, incident 47 falls under rule 78 as an incident called to report the total cost from the legacy program application.

Once a relationship is established between the report data model and the XML schema, a modification specification is written, and the generation of modified legacy program applications is automatically performed. The modified legacy program applications are designed to report the data from the legacy computer system along with XML schema tags that describe the nature of the data. For instance, the following is incident 47 having XML tag information and data field type and value information annotated within it:

```
Incident 47 loc 414 record PRTEC from RS-LINE
    <LINE 2>
 0: "   TOTAL CALLS: " size 14
14: RECORDS-SELECTED-EDIT loc 266 pic Z, ZZ9 size 5
    tag total-calls-by-phone
    id bill\detail-list\detail-by-phone\total-
        calls-by-phone
    type TAG when P
19: "TOTAL TIME:" size 34
53: RS-TIME loc 270 pic 99 size 2
    tag total-time-by-phone
    id bill\total-time
    type TAG when P
55: ":"
56: RS-MM loc 272 pic 99 size 2
58: ":" size 1
59: RS-SS loc 274 pic 99 size 2
61: "" size 2
63: RS-COST loc 276 pic $$$$$.99 size 8
    tag total-cost
    id bill\total-cost
    type TAG when P
71: "" size 2
```

The annotated incidents provide the basis for the modification specification which is provided by mapping engine 26 to code generation engine 24 for the creation of modified legacy program applications. For instance, the modification specification for incident 47 is:

```
node (414, XML-TOTAL-CALLS-ID, 'total-calls-by-
    phone', 'RECORDS-SELECTED-EDIT', 266).
node (414, XML-TOTAL-TIME-ID, 'total-time-by-phone',
    'RS-TIME', 270).
node (414, XML-TOTAL-BILL-ID, 'total-bill-by-phone',
    'RS-COST', 276)
```

Note that the data items RS-HH, RS-MM, and RS-SS have been combined under data item RS-TIME.

Code generation engine 24 applies the modification specification to determine the modifications needed for the legacy code to output appropriate tags relating data to the XML schema. For instance, the following code is added by code generation engine 24 in accordance to the modification specification in order to emit XML formatted data from the modified legacy program applications that relate to incident 47:

```
MOVE RECORDS-SELECTED-EDIT   TO XML-BUFFER
MOVE XML-TOTAL-CALLS-ID      TO XML-UID
CALL 'XML' USING  XML-UID
                  XML-BUFFER
MOVE RS-TIME                 TO XML-BUFFER
MOVE XML-TOTAL-TIME-ID       TO XML-UID
CALL 'XML' USING  XML-UID
                  XML-BUFFER
MOVE RS-COST                 TO XML-BUFFER
MOVE XML-TOTAL-BILL-ID       TO XML-UID
CALL 'XML' USING  XML-UID
                  XML-BUFFER
```

The modified legacy program application calls writer engine 20 to emit output with tags provided from the XML schema stored in context table 22. Once modified legacy program applications 18 are loaded onto legacy computer system 12, writer engine 20 in cooperation with context table 22 is called by modified legacy program applications 18 to output an XML data stream.

The pre-computed data necessary to control the accurate writing of embedded XML elements is generated from the XML schema. The pre-computed data consists of a map from an index to depth, start-label, stop-label, parent-index, and other information necessary to generate correct XML. For instance, the XML schema depicted by FIG. 7 provides a data structure for printing a customer's name, address and identification. FIG. 7A depicts the tree structure of the XML schema shown by FIG. 7. FIG. 7B depicts the computed data structure of the XML schema shown by FIG. 7, including the depth of each element corresponding to the element's position in the tree structure and an index for each element indicating its ancestor element. For instance, the "Customer" element is the root of the XML schema and has a descendant element of "Address". The "Street" element is a descendant of the "Address" element, as indicated by the number 3 corresponding to the identification of the "Address" element.

Referring now to FIG. 8, a flow diagram depicts the process implemented in the write engine to output an XML data stream. The computed data depicted by FIG. 7B is applied to the writing of the XML data stream with reference to the XML schema depicted by FIG. 7. The process begins at step 100 where an XML print command is called along with identification of the schema element and the value to be printed. For instance, the commands:

```
MOVE '861 East Meadow'        TO XML-BUFFER
MOVE XML-CUSTOMER-STREET      TO XML-UID
CALL 'XML' USING  XML-UID
                  XML-BUFFER
``` provide the identification for the "Street" element of the computed data structure.

At step 102, a test is made to see if the XML printing process has been initiated to emit data. If not, the appropriate data structure or current context is initialized and the identified data file is opened at step 104. For example, an XML print instruction relating to customer data would result in initialization of the current context that has "Customer" as the root element. At step 106, a test is performed to determine whether all data of the data structure has been emitted. If all data is emitted, the process proceeds to step 108 where the appropriate XML end tags are emitted and the data file is closed. If, however, the node ID is not at the end of the data structure, then the process proceeds to step 109. For instance, if the node ID is "City" then the process proceeds to step 109.

At step 109, a test is performed to determine whether the called node ID is a descendant of the current node. For instance, the "Street" element is a descendant of the "Address" element. Thus, if the "Address" element is the current element and the "Street" element is the called element, then the process proceeds to step 110. In contrast, if the current element is the "Name" element and the called element is the "Street" element, then the process proceeds to step 112 in order to locate the nearest mutual ancestor node ID having consistent cardinality with the called element. Thus, the mutual ancestor of the "Name" and "Street" elements, the "Customer" element, would be identified. At step 114 the end tags are closed up to the "Customer" element, and the process proceeds to step 110. The cardinality check at step 112 ensures that, if an ancestor only permits a single occurrence of a descendant, then the descendant is only printed once. For example, if a descendant element is emitted in successive occurrences, the cardinality indicates that, between each emission of the descendant, the ancestor element is closed and a new instance of the ancestor is opened.

At step 110, tags are opened from the identified ancestor down through the called node, and attributes of the nodes along the tree structure are emitted along with appropriate values. At step 116 the process returns to step 100 to accept the next value in the XML data stream.

An additional function of writer engine 20 is the delayed processing for writing of data as complete data structures. For instance, writer engine 20 stores attributes, values and text values to a data structure without emitting the data until the all of the attributes, values and text values of the data structure are complete. This delayed processing allows the writer engine 20 to adhere to the sequencing requirements of the XML schema.

The sample output below illustrates the need for this capability.

SAMPLE OUTPUT

Send check payable to

| John Doe | ABC WIRELESS |
| 111 Mizar Pl | P. 0. BOX 666666 |
| Pasadena CA 93436-1204 | DALLAS TX 75263-1111 |

Two addresses are printed side by side on the page. One is the customer address and the other is the remitter address. Thus, a single line of output contains interleaved elements from two distinct subschemas, according to the target XML schema shown below.

TARGET XML SCHEMA

```
<ElementType name="name"/>
<ElementType name="address"/>
<ElementType name="phone-number"/>
<ElementType name="city-state-zip"/>
<ElementType name="customer">
    <element type="name"/>
    <element type="address"/>
    <element type="city-state-zip"/>
</ElementType>
<ElementType name="remitter">
    <element type="name"/>
    <element type="address"/>
    <element type="city-state-zip"/>
</ElementType>
<ElementType name="bill-header">
    <element type="customer"/>
    <element type="remitter"/>
</ElementType>
```

A complete customer address subschema must be emitted before the remitter address subschema. Due to the structure of the legacy code (shown below) it is necessary to buffer up the remitter address components while writing the XML structure for the customer. In addition to its other bookkeeping roles, the context table provides storage for this buffering operation.

The original legacy code can be seen below:

FRAGMENT OF LEGACY COBOL DATA DECLARATIONS

```
05 HL-BILL-HEADER-10.
   10 FILLER     PIC X(49) VALUE SPACES.
   10 FILLER     PIC X(32) VALUE "Send check payable to".
05 HL-BILL-HEADER-11.
   10 FILLER                PIC X     VALUE SPACES.
   10 HLS-CUSTOMER-NAME     PIC X(40) VALUE SPACES.
   10 HLS-REMITTANCE-NAME   PIC X(40) VALUE SPACES.
05 HL-BILL-HEADER-12.
   10 FILLER                PIC X     VALUE SPACES.
   10 HLS-CUSTOMER-ADDRESS  PIC X(40) VALUE SPACES.
   10 HLS-REMITTANCE-ADDRESS PIC X(40) VALUE SPACES.
05 HL-BILL-HEADER-13.
   10 FILLER                PIC X VALUE SPACES.
   10 HLS-CT-ST-ZIP         PIC X(40) VALUE SPACES.
   10 HLS-REMITTANCE-CT-ST-ZIP  PIC X(40) VALUE SPACES.
```

FRAGMENT OF LEGACY COBOL PROCEDURAL CODE

```
WRITE BILL-RECORD FROM HL-BILL-HEADER-10 AFTER 2
WRITE BILL-RECORD FROM HL-BILL-HEADER-11
```

-continued

FRAGMENT OF LEGACY COBOL PROCEDURAL CODE

WRITE BILL-RECORD FROM HL-BILL-HEADER-12
WRITE BILL-RECORD FROM HL-BILL-HEADER-13

The modified code is shown below, with comments describing the successive operations.

MODIFIED LEGACY COBOL PROCEDURAL CODE

```
* Unchanged, since it does not emit anything
* relevant to the schema
    WRITE BILL-RECORD FROM HL-BILL-HEADER-10 AFTER 2
* Emit the customer name
    MOVE HLS-CUSTOMER-NAME TO XML-VALUE
    MOVE CUSTOMER-NAME-ID TO XML-TAG
    CALL "XML" USING XML-TAG XML-VALUE
* Deferred write of remitter name
    MOVE HLS-REMITTANCE-NAME TO XML-VALUE
    MOVE REMITTER-NAME-ID TO XML-TAG
    CALL "XML-SET-NODE-VALUE" USING
        XML-TAG XML-VALUE
    WRITE BILL-RECORD FROM HL-BILL-HEADER-11
* Emit the customer address
    MOVE HLS-CUSTOMER-ADDRESS TO XML-VALUE
    MOVE CUSTOMER-ADDRESS-ID TO XML-TAG
    CALL "XML" USING XML-TAG XML-VALUE
* Deferred write of remitter address
    MOVE HLS-REMITTANCE-ADDRESS TO XML-VALUE
    MOVE REMITTER-ADDRESS-ID TO XML-TAG
    CALL "XML-SET-NODE-VALUE" USING
        XML-TAG XML-VALUE
    WRITE BILL-RECORD FROM HL-BILL-HEADER-12
* Emit customer city-state-zip
    MOVE HLS-CT-ST-ZIP TO XML-VALUE
    MOVE CUSTOMER-CITY-STATE-ZIP-ID TO XML-TAG
    CALL "XML" XML-TAG XML-VALUE
* Deferred write of remitter city-state-zip
    MOVE HLS-REMITTANCE-CT-ST-ZIP TO XML-VALUE
    MOVE REMITTER-CITY-STATE-ZIP-ID TO XML-TAG
    CALL "XML-SET-NODE-VALUE" USING
        XML-TAG XML-VALUE
    WRITE BILL-RECORD FROM HL-BILL-HEADER-13
* Write of deferred remitter node with subnodes.
    MOVE XML-REMITTER-ID TO XML-TAG
    CALL "XML-WRITE-NODE" USING XML-TAG
```

The resulting output for this particular example can be seen below.

XML OUTPUT

```
<bill-header>
    <customer>
        <name>John Doe</name>
        <address>111 Mizar Pl</address>
        <city-state-zip> Pasadena CA 93436-1204</city-state-zip>
    </customer>
    <remitter>
        <name>ABC WIRELESS</name>
        <address> P.O. BOX 666666</address>
        <city-state-zip>DALLAS TX 75263-1111</city-state-zip>
    </remitter>
</bill-header>
```

An XML schema may impose cardinality constraints on the component elements. For example, in the schema below C, C1 and C2 may each appear only once within their respective parents. It is important to ensure this property when producing an instance of this schema.

```
<ElementType name="C1">
<ElementType name="C2">
```

XML OUTPUT

```
<ElementType name="C">
    <element type="C1" maxOccurs="1"/>
    <element type="C2" maxOccurs="1"/>
</ElementType>
<ElementType name="A">
    <element type="C" maxOccurs="1"/>
</ElementType>
```

Some of the precomputed elements of the context table that represent the schema rooted at "A" are shown in the table below.

| ID | Label | Depth | Parent | Cardinality |
|----|-------|-------|--------|-------------|
| 1  | <A>   | 1     | 0      | n           |
| 2  | <C>   | 2     | 1      | 1           |
| 3  | <C1>  | 3     | 2      | 1           |
| 4  | <C2>  | 3     | 2      | 1           |

The ID column holds the unique identifier associated with each element. The Cardinality column indicates a constraint on the number of occurrences of an element within its parent. 'n' means there may be zero or more. '1' indicates that there should be exactly 1.

The table below shows how this information is used dynamically as XML-PRINT commands are executed. (Note that the COUNT column of the CONTEXT shows the change in the value of the cardinality count with respect to a particular schema element.)

| STATE | CONTEXT STACK | COUNT | COMMAND | OUTPUT |
|-------|---------------|-------|---------|--------|
| 0 | [ ] | A=1 | XML-PRINT C1, V11 | <A> |
| 1 | [A] | C=1 |  | <C> |
| 2 | [A,C] | C1=1 |  | <C1>V11</C1> |
| 3 | [A,C] | C2=1 | XML-PRINT C2, V21 | <C2>V21</C2> |
| 4 | [A,C] | C1=0 C2=0 | XML-PRINT C1, V12 | </C> |
| 5 | [A] | C=0 |  | </A> |
| 6 | [ ] | A=2 |  | <A> |
| 7 | [A] | C=1 |  | <C> |
| 8 | [A,C] | C1=1 |  | <C1>V12</C1> |

The initial state, 0, includes an empty stack and no cardinality counts associated with any schema element. The command to print V11 as a schema element C1 causes a check of the state, the output of the <A> and <C> ancestor labels, and the output of the labeled V11 element. The STACK is modified to record the current context of an open <A> and <C> and the cardinality counts for A, C and C1 are set to 1.

The command to print V21 as a schema element C2 causes a check of the state. The STACK as regards the ancestors of C2 is correct, so the only printing operation is the output of the labeled V21 element. The STACK is unchanged. The cardinality count for C2 is set to 1.

The command to print V12 labeled by schema element C1 causes a check of the state. The STACK in state 3 as regards the ancestors of C1 is correct. However, the cardinality count for C1 is equal to 1 which is the permitted cardinality of elements of this type. We therefore close C and reset the cardinality counts for its children, C1 and C2. At this point it can be seen that the cardinality count for C is equal to 1 which is the permitted cardinality of elements of this type. We therefore close A and reset the cardinality count for C to 0. At this point (state 6) the stack is empty, and we output the ancestor labels <A> and <C>, output the labeled V12 element, modify the STACK to record the current context of an open <A> and <C> and set the cardinality counts for C and C1 to 1 and A to 2.

Now, consider the case where the maximum occurrence of elements of type C has no upper bound. That is, the element definition of C within A is changed to:

<element type="C" maxOccurs="n"/>

The third print step now becomes simpler, as shown in the table below:

| STATE | STACK | CONTEXT COUNT | COMMAND | OUTPUT |
|---|---|---|---|---|
| 0 | [ ] | A=1 | XML-PRINT C1, V11 | <A> |
| 1 | [A] | C=1 | | <C> |
| 2 | [A,C] | C1=1 | | <C1>V11</C1> |
| 3 | [A,C] | C2=1 | XML-PRINT C2, V22 | <C2>V22</C2> |
| 4 | [A,C] | C1=0 C2=0 | XML-PRINT C1, V12 | </C> |
| 5 | [A] | C=2 | | <C> |
| 6 | [A,C] | C1=1 | | <C1>V12</C1> |

The first two XML-PRINT operations proceed as before. Because there may be an arbitrary number of C subelements of A there is no need to close the A and open a new one. We close C, setting the STACK to [A], and reset the cardinality counts for C's descendents, C1 and C2. We open a new C and increment C's cardinality count to 2. Finally the labeled V12 element is output, and the cardinality count for C1 is set to 1.

Finally, contrast the previous examples to the case where there is no upper bound on the occurrence of any element. That is, the element definitions of C, C1 and C2 are changed to:

| <element type="C1" | maxOccurs="n"/> |
|---|---|
| <element type="C2" | maxOccurs="n"/> |
| <element type="C" | maxOccurs="n"/> |

The state changes as seen in the table below:

| STATE | STACK | CONTEXT COUNT | COMMAND | OUTPUT |
|---|---|---|---|---|
| 1 | [ ] | A=1 | XML-PRINT C1, V11 | <A> |
| 2 | [A] | C=1 | | <C> |
| 3 | [A,C] | C1=1 | | <C1>V11</C1> |
| 4 | [A,C] | C2=1 | XML-PRINT C2, V22 | <C2>V22</C2> |
| 5 | [A,C] | C1=2 | XML-PRINT C1, V12 | <C1>V12</C1> |

The first and second calls work as before. The third call becomes even simpler. Because there may be an arbitrary number of C1 subelements of C there is no need to close the C and open a new one. The labeled V12 element is output, and the cardinality count for C1 is incremented to 2.

When modifying legacy code certain difficulties arise in deciding when to print schema data that is contained in headers and footers. Consider the example of telephone invoices. The output of an invoicing program may consist of a sequence of invoices. Each invoice may take up a single page or multiple pages. When the invoice occupies multiple pages, its header is typically repeated. As a result, sometimes the header is introducing a new invoice schema element, and at other times it is mere page decoration of the human readable output. In order to recognize the need to close the current invoice tag and open a new one, it is necessary to know that there is some unique identifier associated with each invoice instance and that when the value of this 'key' changes, the current invoice is closed and a new one opened. To enable this computation the context table contains a boolean identifier for key elements and the current values for these elements. This check is performed at the same time as the cardinality check.

In one alternative embodiment, data output from a computer program is effectively buffered as a DOM instance before output. For instance, a legacy computer application for a telephone statement that outputs data as a printing routine likely will not output the data in a sequence that will allow generation of XML according to a desired schema structure without substantial restructuring of the data after output. Thus, to generate XML output requires a two step process of: first emitting XML data according to a schema that mimics the natural structure of the data as printed from the underlying legacy program; and second processing the emitted data by a separate program that applies an XSLT stylesheet to generate the desired format. To simplify this process, the present invention builds the entire ultimate target DOM in the original legacy program, thus effectively buffering data to emit the data when complete.

Figure 9:
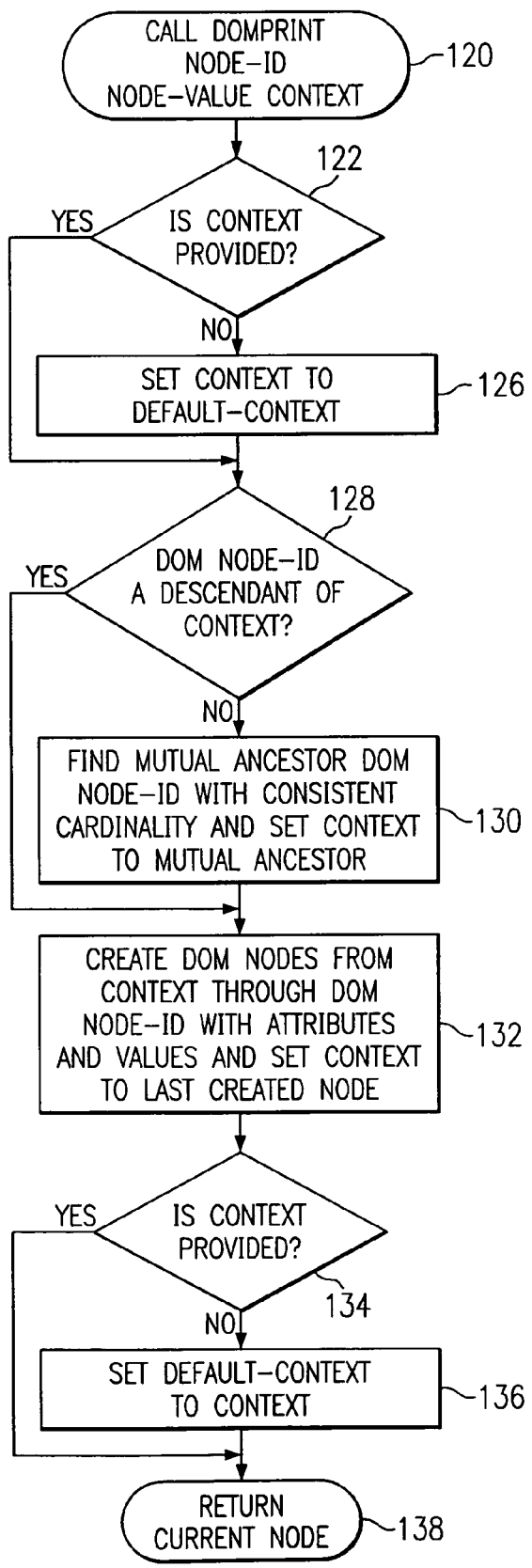
FIG. 9 depicts a flow diagram of an XML print operation that ensures generation of syntactically correct Extensible Markup Language data output by buffering as a DOM instance.

The output of an XML data structure with a DOM instance involves the generation of pre-computed data to accurately control the creation of imbedded XML components in accord with an XML schema and then the application of the pre-computed data to create a desired XML data structure. Referring now to FIG. 9, a flow diagram depicts the steps followed to apply precomputed data to output a desired XML document. At step 120, a call is made with an XML Node-ID tag identifier to identfiy the path to the XML node, a Node-value to identify the value to be inserted, and an optional context that can be used to override the default context.

At step 122, a test determines whether a context value was provided. If not, at step 126 the context is set to the default context.

At step 128, a test determines whether the node to be created is a descendant of the current context. If not, then at step 130 an ancestor node is found that is the minimal ancestor of both the current context and the called Node-ID that satisfies a cardinality check, and the current context is set to the mutual ancestor. Once an appropriate ancestor is found, at step 132 nodes are created from the current context to the called Node-ID along with attributes and text as needed. At step 134, a test determines whether a context value was provided as part of the call. If not, at step 136 the default context is set to the current context. The method then returns at step 138.

As an example, the following sequence of calls:
CALL XML-GEN XML-CURRENT-ADDRESS, "true"
CALL XML-GEN XML-STREET-ADDRESS, "861 East Meadow" will produce the tree structure containing the following XML:

```
<Customer>
    <Address current = "true">
        <Street> 861 East Meadow</Street>
    </Address>
</Customer>
```

Thus, automatic generation of data structures from XML schema and context sensitive creation of DOM instances enhance the simplicity of using XML with both new applications and applications converted from legacy systems. Automation reduces the time for development of new code and revision of legacy applications, and also reduces the likelihood of errors due to the adherence to XML schema requirements. Further, generation of XML data from a legacy system with a target schema that differs from the natural structure of data output from the legacy system is simplified by the transformation of the DOM with an XSLT style sheet. In essence, the DOM instance acts as a buffer that stores data emitted from the underlying program until a desired output is prepared without substantial revision to the structure of the underlying program.

The construction of a DOM instance is illustrated by the following example. A legacy program outputs grade reports for undergraduate and graduate programs. The natural control flow of the original legacy program corresponds to the following XML output:

```
<courseList>
    <course>
        <name>Math 101</name>
        <type>undergrad</type>
    </course>
    <course>
        <name>Math 395</name>
        <type>grad</type>
    </course>
    <course>
        <name>CS 101</name>
        <type>undergrad</type>
    </course>
    <course>
        <name>CS 600</name>
        <type>grad</type>
    </course>
</courseList>
```

The target XDR schema for the data output from the legacy program is:

```
SCHEMA: courseList2.xml
<ElementType name="course">
<ElementType name="undergrad"/>
    <element type="course"/>
</ElementType>
<ElementType name="grad"/>
    <element type="course"/>
</ElementType>
<ElementType name="courseList">
    <element type="undergrad" maxOccurs="1" />
    <element type="grad" maxOccurs="1" />
</ElementType>
</Schema>
```

The data formatted according to the target XDR schema, as opposed to the 'natural' program control flow, is:

```
OUTPUT 2
<courseList>
    <undergrad>
        <course>Math 101</course>
        <course>CS 101</course>
    </undergrad>
    <grad>
        <course>Math 395</course>
        <course>CS 600</course>
    </grad>
</courseList>
```

The working storage section and procedure division of the legacy program is revised to output data according to the target schema, rather than the 'natural' presentation according to the SCHEMA, courselist2.xml, such as:

```
working-storage section.
  01 xmlvars.
*      Handles
    05 gradHandle pic 9(4) comp-5.
    05 undergradHandle pic 9(4) comp-5
    05 gradCourseHandle pic 9(4) comp-5.
    05 undergradCourseHandle pic 9(4) comp-5.
*      Contexts
    05 context pic 9 (4) comp-5.
    05 gradContext pic 9(4) comp-5.
procedure division.
*    Open up and process schema
    Call    "xmlOpenSchema" "courseSchema2.xml"
*    Build handles
    Call    "xmlPathToHandle" using "grad" gradHandle
    Call    "xmlPathToHandle" using "undergrad"
            undergradHandle
    Call    "xmlPathToHandle" using "grad/course"
            gradcourseHandle
    Call    "xmlPathToHandle" using
            "undergrad/course" undergradCourseHandle
*    create root and undergrad node and establish
*    context at that node
    Call    "xmlCreateNode" using undergradHandle ""
            context
*    build gradnode but do not change context
    Call    "xmlCreateNodeincontext" using context
            gradHandle "" gradContext
*    build the nodes---we intersperse the XML prints
*    lines with
*    pseudocode that generates a hypothetical course
*    list
*    WRITE     "Math 101"    "undergrad"
    Call    "xmlCreateNode" using undergradCourseHandle
            "Math 101"
*    WRITE     "Math 395"    "grad"
    Call    "xmlCreateNodeincontext" using
            gradContext gradCourseHandle "Math 395"
            gradContext
*    WRITE     "CS 101"     "undergrad"
    Call    "xmlCreateNode" using
            undergradCourseHandle "CS 101"
*    WRITE     "CS 600"     "grad"
    CAll    "xmlCreateNodeincontext" using
            gradContext gradCourseHandle "CS 600"
            gradContext
*    write the XML output file according to the
*    input schema
    Call    "xmlWriteFile" "basic.xml"
```

The modified working-storage legacy program creates a root and an undergraduate node and establishes context at the undergraduate node. The graduate node is then created so that the root node is the minimal shared ancestor of the undergraduate and graduate nodes, but the context remains unchanged. A pointer, gradHandle, associated with the graduate node allows writing of data to that node without changing context from that of the undergraduate node. For instance, by calling "xmlCreateNode" within the default (undergraduate) context, the undergraduate courses of "Math 101" and "CS 101" are written with undergrad and course tags. By calling "xmlCreateNodeincontext," pointers direct writing of the graduate courses "Math 395" and "CS 600" with grad and course tags. Thus, data is written in accordance with a schema that differs from the natural output of the underlying program.

The present invention has a number of important business applications that relate to e-commerce and to more efficient use of legacy computer reports by brick-and-mortar businesses. One example is that internal reports otherwise printed on paper for manual inspection are instead available for storage on a database in XML format. Once electronically stored, the reports are available as electronic information assets for review by a browser or other electronic analysis. The reports are also much simpler to store in a data warehouse.

Another commercial application is as Enterprise Application Integration (EAI) middleware for transfer of data between applications. Setting up transfer of data from structured databases, such as those using XML formats, is relatively straightforward since data definitions may be treated as semantic tags. In contrast, typical legacy computer system reports are unstructured since they represent data generated according to business logic instead of a data structure. By modifying underlying legacy applications to directly output XML formatted data, the outputted data is more easily treated as structured data files for integration in a suite of enterprise applications.

Another commercial application is Electronic Bill Presentment and Payment (EBPP). In order to provide electronic billing from typical legacy computer systems, a parser is generally used to parse untagged invoice data files and then tag the data files with semantically meaningful identifiers. Parsers are expensive and difficult to set up and maintain. In contrast, modification of underlying legacy computer system code to directly output XML formatted data saves time, requires less expertise and expense, and provides data in a recognized format for e-commerce. Thus, businesses with legacy computer systems may output XML formatted reports that allow the business to take advantage of advances taking place in e-commerce, such as automatic bill payment. For instance, individual telephone customers could receive their telephone bill by e-mail containing a web link to a site that provides the individual's bill detail.

Another commercial application is archival of billing statements. Banks, for example, maintain large archives of customer billing statements as reduced photographic copies on microfiche or as print streams on optical disk systems. Retrieval systems for these archives are complex and difficult to maintain. Data extraction from the print streams is a recent improvement, as disclosed in U.S. Pat. No. 6,031,625 (U.S. Pat. No. 6,031,625), but such a system still requires processing of print streams after they have been output from the legacy application. In contrast, modifying the underlying legacy computer code so it directly produces XML formatted billing statements makes archiving and retrieval of billing statements much simpler. For example, the XML statements can be stored in a relational database for easy retrieval. In addition, the retrieved statements, because they have an XML representation, become directly viewable, for example, using browser technology.

Another commercial application is in business intelligence, which seeks to analyze electronic information assets to determine business behaviors, such as purchasing or selling behaviors. Syndicated data providers obtain data for intelligence analysis through reports that are parsed on a distributor or purchaser basis. This detailed parsing can be even more complicated than the parsing used to support EBPP function. Thus, direct generation of XML formatted data from a legacy computer system providing invoice reports is even more efficient in the business intelligence role than in electronic billing and other applications since detailed data analysis is available without applying detailed parsing systems.

Overall the direct generation of XML formatted data from a legacy computer system reduces friction in information networks by making the transfer of information simpler. This reduces the cost of tracking information, the manual effort to exchange and analyze business information, and reduces the time associated with obtaining valuable business intelligence from existing data sources. By making data available in semantically meaningful form, customers can automatically analyze their suppliers for Vendor Relationship Management, suppliers can automatically analyze their customers for Customer Relationship Management, and manufacturers can automatically analyze markets for their products for Market Intelligence.

Although the present invention has been described in detail, it should be understood that various changes, substitutions and alterations can be made hereto without departing from the spirit and scope of the invention as defined by the appended claims.

What is claimed is:

1. A method for outputting data from a legacy computer system, the data output in Extensible Markup Language format, the method comprising:

generating a model of the legacy computer system, the model comprising one or more incidents within one or more applications of the legacy computer system that output data;

mapping the model of the legacy computer system to an Extensible Markup Language schema; and based at least on the mapping of the model of the legacy computer system to the Extensible Markup Language schema, automatically modifying the one or more applications of the legacy computer system that output data, the one or more modified applications operable to output data written using a Document Object Model from the legacy computer system in Extensible Markup Language.

2. The method of claim 1 wherein automatically modifying the one or more applications further comprises:

providing the legacy computer system with a writer engine, the writer engine having the Extensible Markup Language Schema loaded as a data file; and calling the writer engine with the modified one or more applications when the one or more applications output data, the writer engine populating the Document Object Model according to the Extensible Markup Language schema by building a Document Object Model instance with one or more contexts.

3. The method of claim 2 further comprising:

applying one or more XSLT stylesheets to restructure the Document Object Model instance for outputting data in a predetermined format.

4. A system for outputting data from a legacy computer system in an Extensible Markup Language format, the system comprising:

a modeling engine in communication with the legacy computer system, the modeling engine operable to generate a model of outputted data written by an application residing on the legacy computer system;

a mapping engine in communication with the modeling engine, the mapping engine operable to generate a modification specification by mapping the model of the outputted data written by the application residing on the legacy computer system to an Extensible Markup Language schema; and a code generation engine in communication with the mapping engine and the legacy computer system, the code generation engine operable to modify code of the application residing on the legacy computer system, based at least on the generated modification specification, to directly output data from a Document Object Model as Extensible Markup Language.

5. The system of claim 4 further comprising:

a context table associated with the legacy computer system, the context table providing the Extensible Markup Language schema to the legacy computer system; and a writer engine loaded on the legacy computer system and having the Extensible Markup Language schema stored as a data file, the writer engine communicating with the modified legacy computer system application to buffer data in plural contexts within the Document Object Model for output as Extensible Markup Language.

6. The system of claim 5 wherein the writer engine is coded in the computer language of the legacy computer system.

7. A method for outputting data as Extensible Markup Language from an application running on a computer system, the method comprising:

establishing a relationship of the output data and one or more Extensible Markup Language Document Object Model contexts, the output data corresponding to a write operation of the application for outputting the data, the one or more Extensible Markup Language Document Object Model contexts identifying a position in a target Extensible Markup Language schema of the output data corresponding to the write operation of the application;

building a Document Object Model instance with the one or more Extensible Markup Language Document Object Model contexts; and outputting the data from the Document Object Model instance as Extensible Markup Language.

8. The method of claim 7 wherein establishing the relationship further comprises:

activating plural contexts simultaneously to buffer data for output as a complete Document Object Model instance.

9. The method of claim 8 wherein establishing the relationship further comprises:

creating a node for the output data; and ensuring the correct cardinality of the created node.

10. The method of claim 7 further comprising:

generating the output data with the application;

calling a writer engine with the application when the write operation corresponding to the output data is executed;

providing the generated output data to the writer engine;

outputting, from the writer engine, data from a Document Object Model instance according to the target Extensible Markup Language schema.

11. The method of claim 10 wherein the application comprises a legacy computer system application.

12. The method of claim 11 wherein the writer engine comprises an application run in the computer language of the legacy computer system application.

13. A system for outputting data from a Document Object Model as Extensible Markup Language, the system comprising:

a computer system having an application that outputs data, each data output instance corresponding to a write operation of the application; and a writer engine loaded on the computer system and interfaced with the application, the writer engine having an Extensible Markup Language schema as a data file and the writer engine operable to write the data output by the application in plural active contexts;

wherein the application calls the writer engine when the application outputs data, the writer engine operable to build a Document Object Model instance for output of the data in accordance with the Extensible Markup Language schema.

14. The system of claim 13 wherein the writer engine populates a Document Object Model as a schema element aligned with a current one of the plural contexts by creating Extensible Markup Language tagged nodes down through the schema element of the output data if the schema element of the output data is a descendant of the current context.

15. The system of claim 14 wherein the writer engine is further operable to determine a minimal mutual ancestor of the schema element of the output data and the current context and to traverse the Extensible Markup Language tagged nodes for the current context up to the minimal mutual ancestor and to create Extensible Markup Language tags for the schema element of the output data down from the mutual ancestor.

16. The system of claim 13 wherein the computer system comprises a legacy computer system.

17. The system of claim 16 wherein the application comprises a legacy computer system application modified to output an Extensible Markup Language schema element with the output data.

18. The system of claim 17 wherein the writer engine is written in the code of the legacy computer system.

19. The system of claim 18 wherein the code comprises COBOL.

20. A method for outputting data from a legacy computer system from a Document Object Model instance as Extensible Markup Language, the method comprising:

modifying an application of the legacy computer system such that the modified application is operable to output data having a schema element of a target Extensible Markup Language schema, the output data corresponding to a write operation of the application;

outputting data from the modified application, the output data having the schema element of the target Extensible Markup Language schema;

aligning the schema element of the output data and a current context;

writing the schema element of the output data to a current one of plural contexts of the target Extensible Markup Language schema; and populating a Document Object Model with the output data to output an Extensible Markup Language instance.

21. The method of claim 20 wherein aligning the schema element of the output data further comprises:

determining that the schema element of the output data is a descendant of the current context; and creating appropriate Extensible Markup Language tags down through the schema element of the output data, each Extensible Markup Language tag down through the schema element of the output data being associated with an ancestor of the schema element of the output data.

22. The method of claim 21 wherein aligning the schema element further comprises:
    determining a minimal mutual ancestor of the schema element of the output data and the current context;
    traversing the Extensible Markup Language tags for the current context up to the mutual ancestor of the schema element of the output data and of the current context; and
    creating the Extensible Markup Language tags for the schema element of the output data down from the mutual ancestor to the schema element of the output data.

23. A method for modeling a legacy computer system, comprising:
    identifying incidents within one or more applications of the legacy computer system that output data;
    associating the identified output incidents within the one or more applications with an Extensible Markup Language schema;
    defining a control flow graph of the identified output incidents;
    based at least on the association of the identified output incidents within the one or more applications with the Extensible Markup Language schema, creating a modification specification for modifying the one or more legacy computer system applications to provide output from a Document Object Model instance as Extensible Markup Language; and
    automatically modifying, based at least on the modification specification, the one or more legacy computer system applications such that the one or more modified legacy computer system applications provide output from the Document Object Model instance as Extensible Markup Language.

24. A system for modeling an application of a legacy computer system, the application operable to output data, comprising:
    a modeling engine interfaced with the legacy computer system, the modeling engine operable to:
        analyze the application loaded on the legacy computer system to identify incidents within the application that output data from the legacy computer system; and
        generate a control flow graph of the output operations within the applications, the control flow graph having plural nodes, each node associated with an output incident;
    a graphical user interface in communication with the modeling engine, the graphical user interface operable to display the control flow graph and the incidents within the application that output data from the legacy computer system, wherein the graphical user interface maps the incidents of the application with the control flow graph and an Extensible Markup Language schema; and
    a code generation engine in communication with the graphical user interface and the legacy computer system, the code generation engine operable to modify, based at least on the mapping of the incidents of the application with the Extensible Markup Language schema, legacy computer system application code to directly output data from a Document Object Model as Extensible Markup Language.

* * * * *